US012796702B2

(12) United States Patent
De Bortoli

(10) Patent No.: US 12,796,702 B2
(45) Date of Patent: Nov. 17, 2026

(54) RIPENING CHAMBER AND METHOD FOR RIPENING FRUIT

(71) Applicant: EINENKEL / WIRTH GBR, Landsberg (DE)

(72) Inventor: Valdir De Bortoli, Petrolina (BR)

(73) Assignee: EINENKEL/WIRTH GBR, Landsberg (DE)

( * ) Notice: Subject to any disclaimer, the term of this patent is extended or adjusted under 35 U.S.C. 154(b) by 896 days.

(21) Appl. No.: 18/109,066

(22) Filed: Feb. 13, 2023

(65) Prior Publication Data

US 2023/0180776 A1 Jun. 15, 2023

Related U.S. Application Data

(62) Division of application No. 16/322,613, filed as application No. PCT/EP2018/052831 on Feb. 5, 2018, now Pat. No. 11,576,392.

(30) Foreign Application Priority Data

Mar. 16, 2017 (DE) ......................... 102017105725.0

(51) Int. Cl.

| | |
|---|---|
| ***A23B 7/152*** | (2006.01) |
| ***A23B 2/721*** | (2025.01) |
| ***B65D 81/20*** | (2006.01) |
| ***B65D 85/34*** | (2006.01) |

(52) U.S. Cl.

CPC .............. *A23B 7/152* (2013.01); *A23B 2/721* (2025.01); *B65D 81/2076* (2013.01); *B65D 85/34* (2013.01)

(58) Field of Classification Search

None

See application file for complete search history.

(56) References Cited

U.S. PATENT DOCUMENTS

| | | | |
|---|---|---|---|
| 3,620,765 | A | 11/1971 | McDonnell et al. |
| 5,649,995 | A | 7/1997 | Gast, Jr. |
| 7,650,835 | B2 | 1/2010 | Stein |
| 2003/0150334 | A1 | 8/2003 | Gaebler |
| 2013/0013099 | A1 | 1/2013 | Delele |
| 2014/0072682 | A1 | 3/2014 | Jeong |

(Continued)

FOREIGN PATENT DOCUMENTS

| | | |
|---|---|---|
| AU | 200025232 | 9/2000 |
| DE | 123906 | 1/1977 |

(Continued)

OTHER PUBLICATIONS

International Search Report of PCT/EP2018/052831, mailed Apr. 3, 2018, 6 pages.

(Continued)

*Primary Examiner* — John J Norton

(74) *Attorney, Agent, or Firm* — Ray Quinney & Nebeker P.C.; Paul N. Taylor

(57) ABSTRACT

The present invention relates to a ripening chamber and a method for fruit ripening. In particular, the present invention relates to a banana ripening chamber and a method for the artificial ripening of bananas (banana ripening technique). In a method according to the invention for ripening fruits, bananas, a respiration of the fruits is measured in a closed chamber containing the fruits to be ripened. A ripening chamber according to the invention is adapted to carry out a method according to the invention for ripening fruit.

17 Claims, 1 Drawing Sheet

(56) References Cited

U.S. PATENT DOCUMENTS

| | | | |
|---|---|---|---|
| 2014/0242236 A1 | 8/2014 | Savur et al. |
| 2016/0249630 A1 | 9/2016 | Clarke et al. |

FOREIGN PATENT DOCUMENTS

| | | |
|---|---|---|
| DE | 69414847 | 7/1999 |
| DE | 202007011850 | 11/2007 |
| DE | 102013015182 | 3/2015 |
| EP | 0661006 | 7/1995 |
| EP | 2044844 | 4/2009 |
| EP | 2092831 | 8/2009 |
| GB | 2400299 | 10/2004 |
| JP | S55153556 | 11/1980 |
| JP | S57194746 | 11/1982 |
| JP | H02299541 | 12/1990 |
| JP | H04117239 | 4/1992 |
| JP | H04356158 | 12/1992 |
| JP | H05308899 | 11/1993 |
| JP | H07-128226 | 5/1995 |
| JP | 2002136257 | 5/2002 |
| JP | 2005232157 | 9/2005 |
| JP | 2013512001 | 4/2013 |
| JP | 2019528047 | 10/2019 |
| KR | 10-2007-0097476 | 10/2007 |
| RU | 37979 | 5/2004 |
| WO | WO 95/00030 | 1/1995 |
| WO | WO 2011/082059 | 7/2011 |

OTHER PUBLICATIONS

Office Action in Russian Patent Application No. 2020133775/10(061831), mailed Jul. 19, 2021, 12 pages with English translation.

Office Action in Japanese Patent Application No. 2021-145218; mailed Aug. 10, 2022, 8 pages.

Office Action in Chinese Patent Application No. 20188002901.0, mailed Oct. 8, 2021, 7 pages with English translation.

Office Action received in Japanese Patent Application No. 2019-501973, mailed Sep. 16, 2020, English translation attached, 5 pages.

Office Action in JP Application No. 2019-501973, mailed Jan. 23, 2020, 5 pages.

Office Action for Korean Application No. 10-2019-7002319; mailed Aug. 21, 2020; 8 pages.

Ariwaodo, C.A.; "Handling Strategies and facilities for Horticultural Crops", Open Access library Journal, 9: e8577, 2022, 29 pages.

Indian Office Action from Indian Patent Application No. 202218018319, mailed Jun. 9, 2026, 9 pages.

Kader, A.A., "Postharvest Technology of Horticultural Crops—An Overview from Farm to Fork", Ethio. J. Appl. Sci. Technol. (Special Issue No. 1): 1-8, 2013.

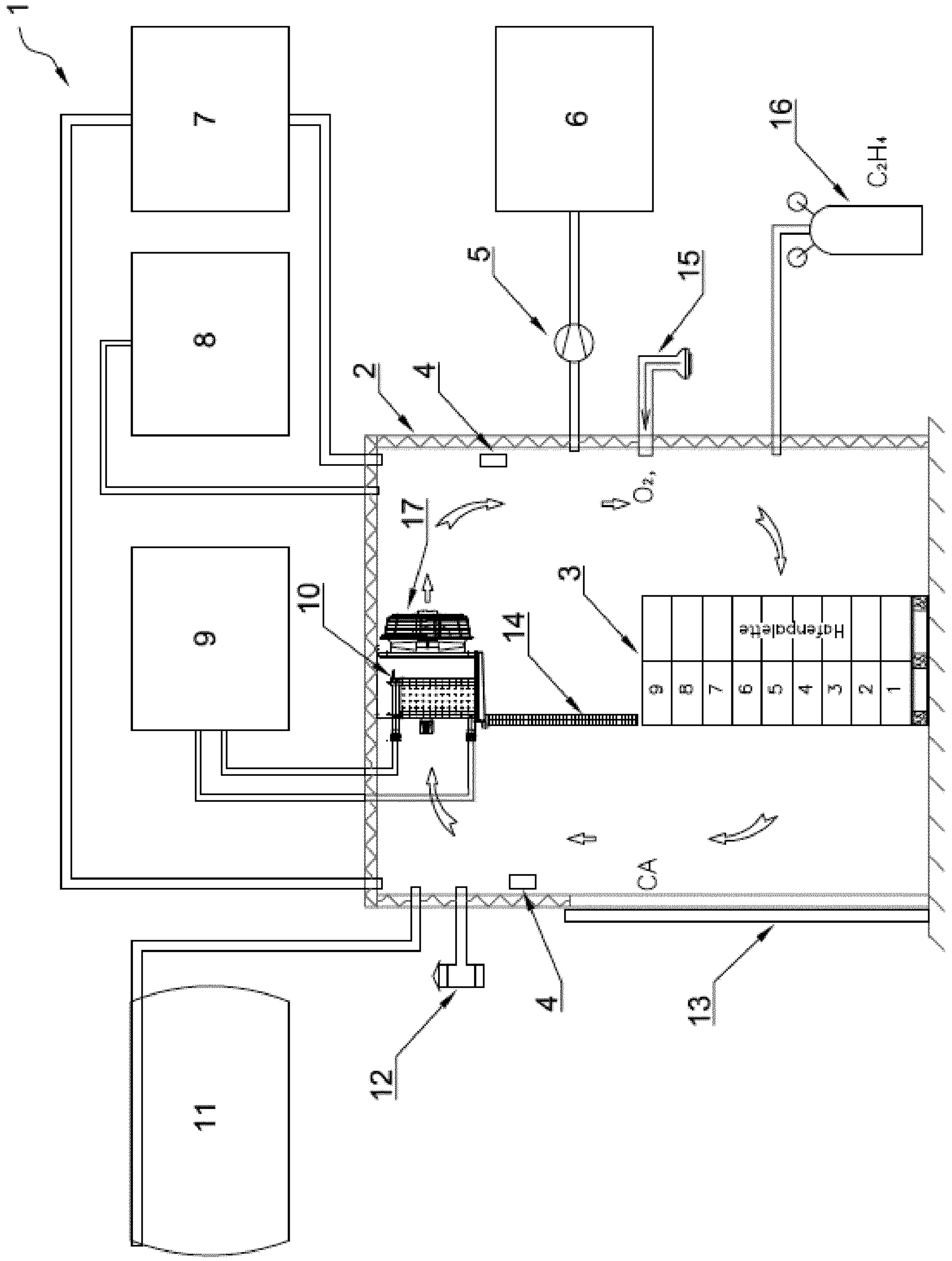
1
7
8
9
6
5
15
16
C2H4
2
4
17
10
14
3
O2,
Hafenpalette
9
8
7
6
5
4
3
2
1
CA
4
13
12
11

RIPENING CHAMBER AND METHOD FOR RIPENING FRUIT

CROSS-REFERENCE TO RELATED APPLICATIONS

This application is a divisional of U.S. patent application Ser. No. 16/322,613, filed Feb. 1, 2019, which is a U.S. Nationalization of PCT Application Number PCT/EP2018/052831, filed on Feb. 5, 2018, which claims priority to German Patent Application No. 102017105725.0, filed on Mar. 16, 2017, the entireties of which are incorporated herein by reference.

The present invention relates to a ripening chamber and a method for fruit ripening. In particular, the present invention relates to a banana ripening chamber and a method for the artificial ripening of bananas (banana ripening technique).

Typically, bananas are already harvested for the consumer market in the green (i.e., immature state) and further processed. The harvested green bananas are then usually ripened in cartons on pallets in special ripening chambers to a desired yellow color within 4-7 days.

However, the use of ripening chambers is not limited to bananas and can be applied analogously for the ripening process of other fruits as well.

In such ripening chambers, conventionally, the air temperature is controlled in a rigid manner according to a certain time schedule (partially also under control of the fruit temperature) and an ethylene concentration (for example 500 ppm or higher) in the chamber is set for 24 hours. The typical parameters for fruit ripening in the prior art are therefore: temperature of the air, temperature of the fruit (banana), ethylene concentration>500 ppm. Partially due to the increase in temperature and the ethylene fumigation the goods are extremely triggered to ripening, then to avoid an overheating of the goods under high energy consumption and high technical effort for the temperature control and to control the temperature of the fruit.

Occasionally in ripening operations for the storage of green bananas as well as after ripening following the storage, CA technology (CA-controlled atmosphere) is used for the ripening chamber in order to be able to better maintain the freshness of the ripened goods after ripening or to preserve the goods for the sale. Using CA technology, a controlled decrease of the level of oxygen in the ripening chamber and an increase of the $CO_2$ concentration is possible, which stops the ripening. For this technique, however, special chambers with gas-tight gate, nitrogen generator, $CO_2$ adsorber technology and corresponding measurement technology are needed.

The CA effect is particularly known with bananas and is there used for storage or preservation of ripened fruits.

Disadvantages of the ripening methods or the ripening chambers used for this according to the prior art are the relatively long ripening process, a high load for the energy storage of the fruit of the fruit ripened therein and a mostly uneven ripening within the chamber, which is for example affected by the position of the fruit in the ripening chamber as well as the initial state of the fruits before being transferred into the ripening chamber. Furthermore, too high and uncontrolled ethylene and $CO_2$ levels cause negative biological effects on the fruit, which are reflected in the deterioration of taste, aroma and shelf life. This is especially noticeable in bananas.

It is thus an object of the present invention to provide an improved ripening method for ripening chambers and corresponding ripening chambers. In particular, a gentler ripening process is to be achieved.

These objects are achieved by a method and a ripening chamber having the features of the independent claims.

Thus, a first aspect of the invention relates to a method for ripening fruits, in particular bananas, in which the fruits to be ripened are arranged in a gas-tight chamber and during the ripening a respiration of the fruits is measured.

In contrast to the standard ripening in ripening chambers, wherein during the ripening process a temperature and an ethylene concentration is set once, in the ripening process according to the invention, in particular for use in a ripening chamber according to the invention, in addition to a controlled temperature control, the respiration (breathing) of the goods is measured and controlled in particular by a regulation of a gas concentration ($CO_2$/$O_2$/ethylene) in a ripening room of the chamber.

The essential advantage of the present invention is that a healthy and stable fruit ripening can be achieved within a few days. For example, in the case of bananas, ripening can be achieved within only 3 days of a color corresponding to a ripening number in the range of 2.5 to 3.5. In particular, an extreme heating and the associated stress can be dispensed with, which would subsequently lead to problems in the temperature control (too high banana temperature) on the marketing route. The shelf life of the goods is also significantly improved, since the natural energy storage of bananas is spared, resulting in a good shelf life after the ripening. Furthermore, a better and more uniform ripening over the entire ripening chamber is achieved.

The quality of the fruit ripened according to the invention is reproducible and thus consistently good. Furthermore, the necessary ripening time (depending on the goods initial quality and situation) can be automatically determined by the ripening program and be calculated (can thus vary accordingly). By taking into account the fruit respiration during the ripening process, the consumption of ethylene can be controlled specifically to the needs of the bananas and can thus be significantly reduced compared to the prior art. The shortened ripening time can also increase the ripening chamber throughput and save energy for process control. In particular, the goods can also be stopped more easily in the current ripening stage or held there. This is particularly advantageous for long delivery routes to the end customer, since in this case a predetermined ripening state varies and can be controlled by the method according to the invention. Furthermore, it is possible to react flexibly to changed selling/sales volumes for the retail trade, which leads to a significantly reduced risk of complaint and goods failure (spoilage).

In a preferred embodiment of the invention, it is therefore provided that the ripening is guided and/or controlled as a function of respiration of the fruits via a $CO_2$, an $O_2$ concentration and/or an ethylene concentration in the chamber, in particular in a ripening room of the chamber. This is based on the findings on the ripening process of fruits, especially of tropical fruits. During the ripening process, a gas exchange of the fruits with the environment takes place, which is referred to as respiration, i.e., breathing. By absorbing oxygen, the fruits ripen to form and store low molecular weight carbohydrates, especially sugars. In this process carbon dioxide is formed, which escapes as respiratory gas. This process is triggered by the presence of ethylene, meaning $C_2H_4$, wherein the ethylene is converted to the relevant carbohydrates in the presence of oxygen. In addition to what has been described, due to the ripening further processes in the fruit take place simultaneously, which are for example shown by the color and/or firmness of the fruit, so that the respiration parameters ($CO_2$, $C_2H_4$ and $O_2$) can be an indication of the degree of ripeness.

The formation of carbon dioxide, which is associated with an increase of a $CO_2$ concentration in the ripening chamber, can then serve as a measure of the sugar production associated with a ripening of the fruits in a gas-tight ripening chamber. The consumption of oxygen, i.e., the decrease of an oxygen concentration in the ripening chamber, as well as the increase in the consumption of carbon dioxide, i.e., the increase of a carbon dioxide concentration in the ripening chamber, serve according to the invention as a measure of the progress of the ripening of the fruits.

The present invention is therefore characterized in particular by comparison with conventional ripening methods in that the fruit respiration during the ripening process, in particular in a ripening chamber according to the invention, is controlled and monitored by suitable means for measuring the respiration and a means for evaluating the obtained measured values.

In addition, the present invention is characterized in that the $CO_2$ concentration is taken into account and controlled over the entire ripening as ripening parameter (and not just as ripening-inhibiting storage factor as in the prior art) in a corresponding ripening method in the process flow of the ripening process.

It has been shown that excessive ethylene fumigation of fruits can effectively lead to an override of the ripening process, which is difficult to stop and control. As a result, the fruits ripen uncontrollably, and the energy stores of the fruits are consumed more heavily and are stretched, which manifests itself in an irregular ripening pattern and a reduced shelf life of the fruit. This also negatively influences the taste of the banana due to fermentation effects. The measurement of the respiration according to the invention now makes it possible to selectively fumigate the fruits with ethylene, which does not exceed a necessary level of ethylene, so that a particularly gentle ripening of the fruits is achieved.

In a preferred embodiment of the invention, it is therefore provided that a predetermined ethylene concentration is set in a ripening chamber of the chamber, which is varied over the duration of the ripening process. This has the advantage that the ethylene concentration does not exceed a necessary level and in particular can be adapted to the progress of the ripening during the process, which in turn leads to gently ripened fruits with a uniform ripening image.

In a particularly preferred embodiment of the invention, it is additionally provided that, when fumigated with ethylene, the ethylene concentration is in a range from 50 ppm to 300 ppm, preferably in a range from 80 ppm to 220 ppm, in particular is at no time during the process according to the invention above 300 ppm is. It has been shown that a fumigation of more than 300 ppm in the ripening chamber leads to an override of the ripening process, which is avoided by the indicated preferred concentrations.

The values given relate in particular to at least 60% filled ripening chambers and are to be adapted correspondingly at lower utilization of the ripening chambers. In this respect, for example, the ethylene value is to be regarded as a regulated absolute gas value in ppm. On the other hand, as a flexible setpoint, it reflects the $CO_2$ production, which in turn is connected with the occupancy rate in the chamber. In other words, the less goods in the chamber, the lower the $CO_2$ production to be measured.

Advantageously, the ethylene concentration within the ripening room of the chamber is reduced after a predetermined period of time and kept constant at the reduced level, in particular not more than 50 ppm, preferably not more than 30 ppm. This embodiment of the method according to the invention further optimizes the uniformity of the fruit ripening and the shelf life of the ripened fruits, since the ripening is even gentler. An initially higher concentration is necessary to first initiate the ripening but is then reduced to a minimum of ethylene to realize a progressive, very gentle ripening up to a predetermined set point. In addition, this embodiment has the advantage of saving on ethylene, which brings a cost savings.

With particular advantage, the ripening process of the method according to the invention comprises a plurality of phases, which are characterized in particular by the gas concentrations and/or the temperatures in the ripening room. In this case, in a first phase, a steady increase, in an intermediate phase or second phase an increase, which is less steep than that of the first phase, and in a final phase, a constant carbon dioxide concentration in the ripening room is measurable.

The first phase, or start phase, of the method according to the invention initially makes it possible for all the ripening fruits arranged in the ripening room of the chamber to be brought to a similar ripening state initially, so that all the fruits show substantially the same starting conditions for ripening and thus under the following same ripening conditions form a comparable ripening result. One measure of this is the carbon dioxide release of the fruits during ripening. This initially increases abruptly with the onset of ripening and steadily in the course of the ripening progress. Only when a steady and even release of carbon dioxide within a period of time for all fruits take place, a steady increase in carbon dioxide concentration can be measured in the ripening chamber. It should be noted at this point that in the method according to the invention, which provides the implementation in a gas-tight ripening room, as already described above, the $CO_2$ concentration or its increase or decrease is always indirectly proportional to an oxygen concentration or its increase or decrease, as long no active removal or supply of one of the gases ($O_2$, $N_2$, $CO_2$) in the ripening room takes place. Preferably, the constant increase in the $CO_2$ concentration, or a constant decrease in the $O_2$ concentration, marks the starting point of an intermediate phase in which active fumigation with ethylene takes place.

With particular advantage, in the intermediate phase, the $CO_2$ and/or $O_2$ concentration at a low increase in the range of 0.1-0.5 vol. %, in particular in the range of 0.1 to 0.3 vol. %, is kept constant, which characterizes a gentler ripening. The end point of the intermediate phase is preferably the achievement of a maximum carbon dioxide concentration, in particular a predetermined value in the range of 1.5 to 3 vol. %, preferably at 2 vol. %. Alternatively, or additionally, the achievement of a predetermined color impression of the fruits (in particular in the case of bananas) may define the end of the intermediate phase.

In the final phase, the supply of $O_2$ and ethylene and/or a removal of $CO_2$, for example by a $CO_2$ gas adsorber, the gas concentrations are kept constant at a certain level so that further ripening is increasingly prevented.

In a preferred embodiment of the invention, it is provided that the $CO_2$ concentration is regulated by addition of ethylene, addition of oxygen, addition of nitrogen and/or removal of $CO_2$. This embodiment allows an active intervention in the ripening process and associated therewith, an intensification or reduction of the ripening process in the fruits initiated by adjustable parameters.

Optionally, active manipulation of the ripening process is also enabled by other atmospheric parameters within the ripening room of the chamber. Thus, in a further preferred embodiment of the invention, it is provided that guidance and/or control of the temperature takes place in the ripening room of the chamber and in particular of the fruits.

With particular advantage, the measurement and/or control of the aforementioned parameters is constant or at predetermined intervals. This provides, in particular, that the measured values are monitored permanently or at short intervals, and that a control only takes place, when the critical limit value is exceeded or fallen below. Alternatively, or additionally, a control takes place, after adjustment or re-adjustment of individual parameters in predefined intervals or at predetermined times, which are stored in a defined method cycle. In this embodiment, depending on an initial state of the fruits, the type of fruits and/or the quantity of fruits, the method according to the invention comprises in particular several cycles which are contained in the above-described three phases and, in particular, time intervals, temperature parameters and fumigation parameters as well as limit values for gas concentrations within of the ripening room. This embodiment enables in the broadest sense to carry out an automatable implementation of the method according to the invention.

Another aspect of the invention relates to the measurement of a degree of ripeness of the fruits by means of photometric measurement, which is preferably carried out automatically. For this purpose, in particular the color impression of the fruits is determined and assigned to this a so-called ripening number (after color plates of banana producers). The degree of ripeness measured photometrically is used as a ripening indicator as an alternative or in addition to the measured respiration and is used in particular as a control parameter for the method in the sense of a control loop. Thus, as an alternative or in addition to a measured $CO_2$ concentration, depending on a photometrically determined ripening number, the regulation of the ripeness parameters such as temperature and ethylene concentration can take place in a manner equivalent to the above-described embodiments.

As a further ripening indicator, which shows in the broadest sense proportional behavior to the degree of ripeness of fruits, in particular bananas, but also tomatoes, is a relative content of chlorophyll on a surface or a near-surface region of the fruit. This is then accessible as a rule parameter by means of a color impression as above for the determination of the degree of ripeness. The relative chlorophyll content is preferably measured indirectly by radiation, which is emitted after excitation of the chlorophyll contained in the fruit with light, in particular with IR radiation.

Accordingly, one aspect of the invention relates to a process for ripening fruits, in particular bananas, in which the fruits to be ripened are arranged in a gas-tight ripening room and, and their ripening is measured during the ripening of the fruits, on the basis of a respiration, a relative chlorophyll content or its change over time and/or a color impression.

Another aspect of the invention relates to a ripening chamber for ripening and storing fruits comprising a gas-tight ripening room, wherein the ripening room is adapted to carry out the method according to the invention in one of the aforementioned embodiments.

In a preferred embodiment, the ripening chamber comprises in each case a means for measuring an ethylene concentration, a $CO_2$ concentration, an $O_2$ concentration and/or a temperature (air and fruit temperature) in the ripening room of the chamber and corresponding means for evaluating the measured values obtained. This embodiment enables to monitor the respiration which is essential for the method according to the invention and to actively control the ripening process through the atmospheric parameters in the ripening room.

According to the invention, the chamber comprises a ripening room, which is designed to be gas-tight according to criteria of a so-called CA bearing technology and, as such, is closed to the outside CA gas-tight. The requirement for the gas-tightness is reached when, after generation of an under- or over-pressure of 15 mm WC (water column=150 Pa) in the ripening room, this pressure drops/or increases within 0.5 hours by a maximum of 5, preferably 4, in particular 3, preferably 2 mm WS (20 Pa), wherein a smaller numerical value is associated with increased tightness. The ripening room comprises a gas-tight CA-Gate and preferably a means for regulating the supply air, the exhaust air and/or an over/under pressure of the ripening chamber. In addition, preferably a means for generating nitrogen, a means for adsorbing $CO_2$ and corresponding measurement technology are provided and fluidly connected to the ripening room of the chamber.

In a further preferred embodiment, the chamber comprises a, associated with at least one means for evaluation, means for controlling and regulating an atmosphere within the ripening room of the chamber.

In a preferred embodiment, the chamber comprises means that allow a permanent air circulation, for example air fans. This is reinforced by an air foreclosure system at the fruit carton (carton with pallet) for generating pressure differences across the carton, since then an air or gas exchange through the cartons is favored. This is particularly useful in the ripening of bananas. For uniform ripening, which accompanies uniform color development in all cartons, preferably only one air-rotation function is installed. In conventional ripening systems, to improve the uniformity of the ripening result, a fan-reversing direction function was necessary, which is no longer required in the system according to the invention.

If necessary, in system according to the invention, consisting of the ripening chamber and method, nitrogen can be flushed into the chamber and excess $CO_2$ can be removed from the chamber atmosphere. If the oxygen content is too low, for example, oxygen is supplied to the ripening room in a controlled manner via a gas-tight ventilation system. Furthermore, the air circulation rate (air volume flow and fan speed) in the ripening room dynamically adjusts to the ripening process and airflow permeability of the banana cartons, preferably automatically. Advantageously, only one direction of rotation/air direction of the air fans over the fruit cartons is necessary and nevertheless a uniform ripening and color development of the fruits in the entire ripening room is ensured.

This ideal uniform ripening in the ripening room or within the cartons allows the visual determination of the degree of ripeness based on the color impression of the fruits. This is especially the case with the ripening of bananas.

Further preferred embodiments of the invention result from the remaining features mentioned in the sub claims.

The various embodiments and aspects of the invention mentioned in this application are, unless stated otherwise in the individual case, advantageously combinable with one another. In particular, representations and descriptions of preferred embodiments and embodiments of the method are always transferable to the ripening chamber and vice versa.

The invention will be explained below in embodiments with reference to the accompanying drawings. In particular:

FIG. 1 is a schematic representation of a ripening chamber according to the invention in a preferred embodiment of the invention.

FIG. 1 shows a ripening chamber according to the invention with technique 1 comprising a ripening room 2 for containing fruits to be ripened or stored. The ripening room 2 is designed gas-tight in the sense of a so-called CA quality, so that only a very small gas exchange takes place between the interior of the ripening room 2 and an exterior of the chamber 1. This is ensured by the fact that the ripening room 2 is loaded via a CA-Gate 13 with the filling material 3, so the fruits. Only an optimal ripening and storage of fruits and vegetables with absolutely uniform and reproducible gas concentrations ensures uniform ripening or permanently fresh fruits. This is ensured with a CA-Gate 13, which closes, for example, according to the principle of static contact force. The filling material 3 is arranged for example on a so-called port palette. The room volume of a preferred ripening room 2 is usually between 177 $m^3$ and 266 $m^3$, depending on the type of chamber. However, the dimensions can be adapted to a desired amount of the filling material 3 and structural conditions. In the preferred standard chamber with 177 $m^3$ to 266 $m^3$ room volume 24 so-called harbor pallets are preferably stored in a so-called nine-carton stacking at a utilization of the ripening room of 100%. Based on bananas as fruits, which are packed in a carton of approx. 20 kilos, at full capacity 54 cartons of 20 kg each result, i.e., about 1,080 kg of bananas per harbor pallet. This results for 24 pallets in a total volume of 25,920 kg of bananas per standard ripening chamber 1.

The pallet size, pallet quantity and amount of ripening may vary.

It was found that from a utilization of the ripening room 2 of 60%, i.e., 14 filled pallets in relation to the above example, the concentration values in the method according to the invention do not need to be adapted. At a lower utilization and optionally at each deviating utilization from 100% of the ripening room 2, an adjustment of the monitoring and regulating parameters of the method according to the invention, for example, with the aid of a control program, can take place.

The ripening room 2 has at least one measuring means 4, for example for temperature measurement, or is connected to a device 5+6, which allows a removal, or a diversion of gas located in the ripening room 2 for the measurement of atmospheric parameters. These atmospheric parameters are for example a carbon dioxide concentration, an oxygen concentration and/or an ethylene concentration. In addition, the ripening room 2 is preferably fluidly connected to an ethylene supply 16, an oxygen supply 15, for example as a fresh air supply, and a nitrogen generator 8. These can release an amount of gas defined by the control means into the ripening room 2 by a control means for regulating the gas atmosphere within the ripening room 2. In addition, the ripening room is fluidly connected to a carbon dioxide adsorber 7, which enables a removal of carbon dioxide. In order to avoid an increase in pressure in the ripening room 2 in the case of a gas supply, for example when fresh air supply is required by the adjusting means 15, a required nitrogen supply or due to ethylene fumigation, the ripening room 2 also has a pressure flap 12 which is set up to compensate an over- or under-pressure. Alternatively, or additionally, the ripening room 2 is fluidly connected to a so-called lung 11, in which excess gas can be released or from which gas can flow back from. Thus, certain pressure fluctuations in the ripening room can be compensated.

In addition to the respiration gases ethylene, oxygen and carbon dioxide, the ripening can be influenced by further parameters within the ripening room 2, in particular the temperature. In order to provide an opportunity for intervention here, the ripening room 2 preferably has a heat exchanger 10 in combination with fans 17, which is fluidly connected to a temperature control, for example a cooling and/or a heater.

The adjusting means and devices 4, 5, 6, 7, 8, 9, 11 suitable for influencing the atmosphere within the ripening room 2 and the ethylene supply 16 are preferably connected to a control device (not shown) in which, for example, an algorithm for controlling a method is stored, which enables an automatic control of the atmosphere within the ripening room 2 as a function of measured values and time parameters. In particular, in this case the method according to the invention is carried out, which can be carried out automatically and/or at least partially manually controlled.

This can preferably be achieved by measuring how much $CO_2$ develops within about 1 to 2 hours in the ripening room 2 as a result of the ripening processes or by how much the proportion of $CO_2$ in the ripening room increases (fruits such as bananas absorb oxygen and release the same amount of $CO_2$). If this respiratory quantity assumes a substantially constant value and is not fluctuating, then the second phase or intermediate phase can already be launched with the ethylene fumigation. In the second phase of ripening, a significantly lower ethylene concentration (80-200 ppm, preferably 150 ppm) is required in comparison with the prior art. Subsequently, the ethylene proportion in the chamber atmosphere is further lowered and kept at a very low level (15-40 ppm, preferably 30 ppm). Furthermore, in this phase, a certain concentration of $CO_2$ (used here as a ripening factor and not as a storage factor) can be set and preferably kept over a longer period of time.

In order to be able to keep this atmosphere constant over a longer period of time, CA technology is preferably used. An otherwise typically performed flushing of the ripening chamber with fresh air is not intended in the method according to the invention.

A method according to the invention performable with the above-described ripening chamber will be described in detail in a preferred embodiment. In this embodiment, the method comprises a plurality of cycles that substantially correspond to a first phase, an intermediate phase, and a final phase or are included in them.

In the first phase, a comparable state of the individual fruits, based on the ripening stage (degree of ripeness and state of the goods at the beginning of ripening), is set. Then the actual ripening process takes place in the intermediate phase, which is kept constant in the final phase at the gas concentrations. Based on a carbon dioxide concentration, the first phase comprises a comparatively steep increase in the concentration in the range of 0.1 to 5%/h, preferably in the range of 0.2 to 0.35%/h, the second phase—the intermediate phase-a comparatively low increase in the range of 0.05 to 0.2% while in the final phase the $CO_2$ increase has no longer a relevant significance.

First Phase:

The first phase comprises the setting of a temperature in a temperature range of 13-20° C. and a regular, in particular hourly, measurement of the carbon dioxide production by the fruits. If this has reached a constant value, in other words if the increase in carbon dioxide concentration within the ripening room is linear and uniform, the temperature within the ripening room will be increased slightly. This condition is kept for a few hours and then ripening is initiated by fumigation with ethylene. This involves fumigation with a variable starting set point in the range of 80-300 ppm of ethylene, wherein the actual required value is calculated on the basis of the carbon dioxide concentration increase and the filling amount of the ripening room.

Within the first phase, an increase in the concentration of carbon dioxide in the range of 0.05-0.4% by volume in a time frame of 1.5-3 hours is assumed.

Intermediate Phase:

The intermediate phase takes a period of about 1 to 3 days during which the temperature is kept stable within a range of 15-20° C. In this process, the carbon dioxide concentration is measured at regular time intervals, for example in the range of 1.5-2.5 hours, to determine how much carbon dioxide is produced by the fruits, as this allows a conclusion on the ripening process. The increase in carbon dioxide concentration in this phase should describe a substantially linear function with a low increase, in particular with a lower increase than in the first phase, preferably an increase of less than 1%, preferably less than 0.5%. If the carbon dioxide concentration, in particular its increase, deviates from the setpoint value, readjustment is made by the adjusting means of the ripening chamber 1. If, for example, an increase in the carbon dioxide concentration is too high, therefore the fruit is ripened too quickly, the setpoint value for an ethylene supply can be lowered or the ripening room can be flushed with nitrogen in order to reduce an oxygen content within the ripening room. Conversely, for example, an ethylene supply may be increased to stimulate the ripening process.

The intermediate phase essentially lasts until a desired degree of ripeness of the fruits has been set. For this, the fruit is checked regularly. The ripening indicator used is, for example, the color or the properties of the fruit. Especially with bananas, the color of the fruit is also an expression of the degree of ripeness. Increasing yellow coloring correlates with a progressive degree of ripeness of the banana. For fruits that allow such a correlation of the degree of ripeness with the external appearance, the monitoring of the degree of ripeness or the detection of the final state can be automated, for example by means of photometric measurements of the degree of ripeness. For this purpose, for example, a color impression of the fruits as definitions for the predetermined degree of ripeness, in particular as ripening number (as typical for bananas) stored in the program. If the color impression is achieved with at least one measured fruit, the intermediate phase is ended, and the final phase is launched, if not another ripening cycle takes place within the intermediate phase.

Thus, as an alternative or in addition to the concentration of a respiration gas, it is preferred to use the determination and monitoring of the ripening number as a measure of a color impression as a control parameter for the method according to the invention. As well as the measurement of the respiration parameters, the measurement of the color impression and/or the assignment of the ripening number is carried out manually and/or at least partially automated, wherein the last case of the automated measurement and assignment is preferred for the purpose of process simplification and process reliability.

Final Phase:

In the final phase, the temperature, starting from the temperature value of the intermediate phase, is lowered slowly, i.e., in particular over several hours, in particular over 5 to 30 hours, to a value of below 15° C. In addition, the gas atmosphere is frozen, meaning another respiration is prevented. The carbon dioxide concentration and the ethylene and the oxygen concentration remain substantially constant in this phase, wherein a comparatively high carbon dioxide concentration of more than 1%, preferably more than 1.5%, is set. The oxygen concentration in this phase should be in a range of 10 to 30% by volume, in particular not more than 25% by volume.

In a preferred embodiment, the ripening program according to the invention comprises nine cycles, which can be assigned to the above-mentioned three phases. These are shown in Table 1. In principle, the method according to the invention is carried out with a number of cycles in the range from 4 to 12.

After completion of the final phase, the actual ripening process is completed. The ripening room can be opened and does not have to be gas-tight anymore. The goods can either be further be ripened in a controlled manner in the chamber to desired color or further ripen or develop outside under different temperatures according to the desired color.

TABLE 1

Parameters of the method according to the invention in a preferred embodiment in an embodiment of 9 cycles.

| Phase | Cycle | t in h | T in ° C. | $c(CO_2)$ | $c(O_2)$ | $c(N_2)$ | $c(C_2H_4)$ |
|---|---|---|---|---|---|---|---|
| First phase | 1 | 3-6 | 12-20 | measured | | | |
| | 2 | 3-18 | 15-20 | 0.2-0.4 vol %/h | | | 80-300 ppm |
| Intermediate phase | 3 | 11-13 | 15-19 | Setpoint: 0.1-0.2%/h Max: 2.5% | | regulated | |
| | 4 | 6-8 | 12-17 | 2% | 15-20 | As required | 10-30 ppm |
| Final phase | 5 | 4-6 | T lowered by 0.5-2.5° C. | 2% | 15-20% | | 10-30 ppm |
| | 6 | 2-4 | T lowered by 0.5-2.5° C. | 2% | 15-20% | | 10-30 ppm |
| | 7 | 2-4 | T lowered by 0.5-2.5° C. | 2% | 15-20% | | 10-30 ppm |
| | 8 | 5-7 | T lowered by 0.5-2.5° C. | 2 | 17-20% | | 15-25 ppm |
| | 9 | 2-4 | 10° C. < T < 15 | 2% | 20% | | 20 ppm |

REFERENCE LIST

1 ripening chamber with technology

2 ripening room 3 transport aids with goods
4 temperature sensors
adjusting means gas metering pump
6 control means
7 $CO_2$-Adsorber
8 $N_2$-Generator
9 apparatus for transferring cold and heat to a liquid medium
heat exchangers air/liquid medium for temperature control (cooling/heating)
11 lung
12 pressure flap
13 CA-Gate
14 flexible air foreclosure system
15 Oxygen aeration device with fan
16 ethylene gas mixture
17 fans

The invention claimed is:

1. A ripening chamber for ripening and storing fruits, the ripening chamber comprising:

a gas-tight ripening room configured to receive fruits to be ripened; and a controller programmed to:

measure respiration activity of the fruits to be ripened during ripening in the gas-tight ripening room; and continuously vary a concentration of ethylene in the gas-tight ripening room depending on one or more of an increase in $CO_2$ concentration or a decrease in $O_2$ concentration.

2. The ripening chamber of claim 1, further comprising:

a sensor for measuring one or more of an ethylene concentration, a $CO_2$ concentration, an $O_2$ concentration, or a temperature inside the gas-tight ripening room, wherein the sensor is connected to the controller for evaluating measured values from the sensor.

3. The ripening chamber of claim 1, wherein the controller is further programmed to:

fumigate the gas-tight ripening room with ethylene for a period, wherein during the period, a concentration of ethylene in the gas-tight ripening room is varied in a range of 50 ppm to 300 ppm, wherein during the period, the concentration of ethylene in the gas-tight ripening room is actively and continuously varied depending on one or more of an increase in $CO_2$ concentration or a decrease in $O_2$ concentration.

4. The ripening chamber of claim 1, wherein the controller is further programmed to control ripening of the fruits to be ripened as a function of a respiration of the fruits to be ripened over one or more of a $CO_2$ concentration, an $O_2$ concentration, or an ethylene concentration in the gas-tight ripening room.

5. The ripening chamber of claim 4, wherein the controller is further programmed to set or regulate a predetermined ethylene concentration in the gas-tight ripening room, and vary the ethylene concentration in the gas-tight ripening room over a ripening duration.

6. The ripening chamber of claim 5, wherein the controller is further programmed to, after a predetermined period of time, maintain a lower level ethylene concentration constant, at most at a concentration of 50 ppm.

7. The ripening chamber of claim 1, wherein the controller is further programmed to implement a plurality of phases, which are characterized by their gas concentrations, wherein in a first phase, a steady increase is measurable.

8. The ripening chamber of claim 7, wherein the controller is further programmed to initiate an intermediate phase, of the plurality of phases, as soon as a constant increase in a $CO_2$ concentration is measured, or a constant decrease in an $O_2$ concentration is measured, in the first phase, wherein, in the intermediate phase, the gas-tight ripening room is fumigated with ethylene.

9. The ripening chamber of claim 8, wherein when fumigated with ethylene, an ethylene concentration of the gas-tight ripening room is set in a range of 80 to 250 ppm.

10. The ripening chamber of claim 9, wherein after a predetermined period of time, the ethylene concentration of the gas-tight ripening room at a lower level is kept constant, at most at a concentration of 30 ppm.

11. The ripening chamber of claim 7, wherein in a final phase of the plurality of phases, no increase in a $CO_2$ concentration in the gas-tight ripening room is measurable.

12. The ripening chamber of claim 11, wherein in the final phase, one or more of the $CO_2$ concentration or an $O_2$ concentration in the gas-tight ripening room is kept constant.

13. The ripening chamber of claim 1, wherein the controller is further programmed to regulate one or more of an absolute $CO_2$ concentration or a change in $CO_2$ concentration in the gas-tight ripening room by:

one or more of addition of ethylene, addition of $O_2$, addition of nitrogen, or removal of $CO_2$, and regulating temperature.

14. The ripening chamber of claim 1, wherein the controller is further programmed to control a temperature of the fruits based on controlling a temperature in the gas-tight ripening room.

15. The ripening chamber of claim 1, wherein the measurement of parameters by the controller is carried out continuously or at intervals.

16. The ripening chamber of claim 1, wherein the controller is further programmed to measure a color impression automatically to assign a degree of ripeness described by a ripening number.

17. The ripening chamber of claim 16, wherein the measurement of the degree of ripeness is part of a control loop implemented by the controller.

* * * * *